July 9, 1935.  J. T. REMEY  2,007,215
STABILIZED VIBRATION ABSORBING MOUNTING
Filed Nov. 12, 1931  2 Sheets-Sheet 1
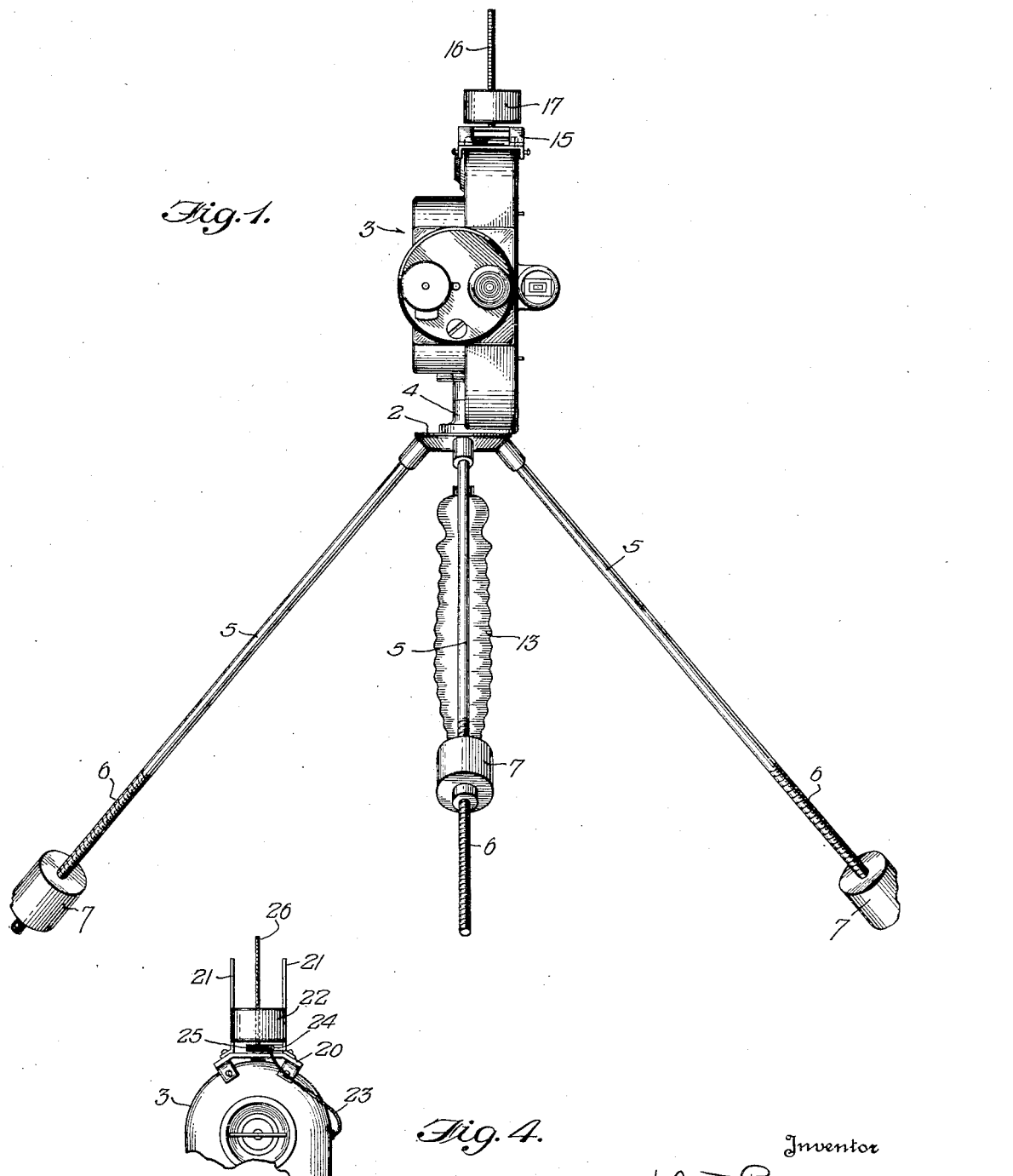

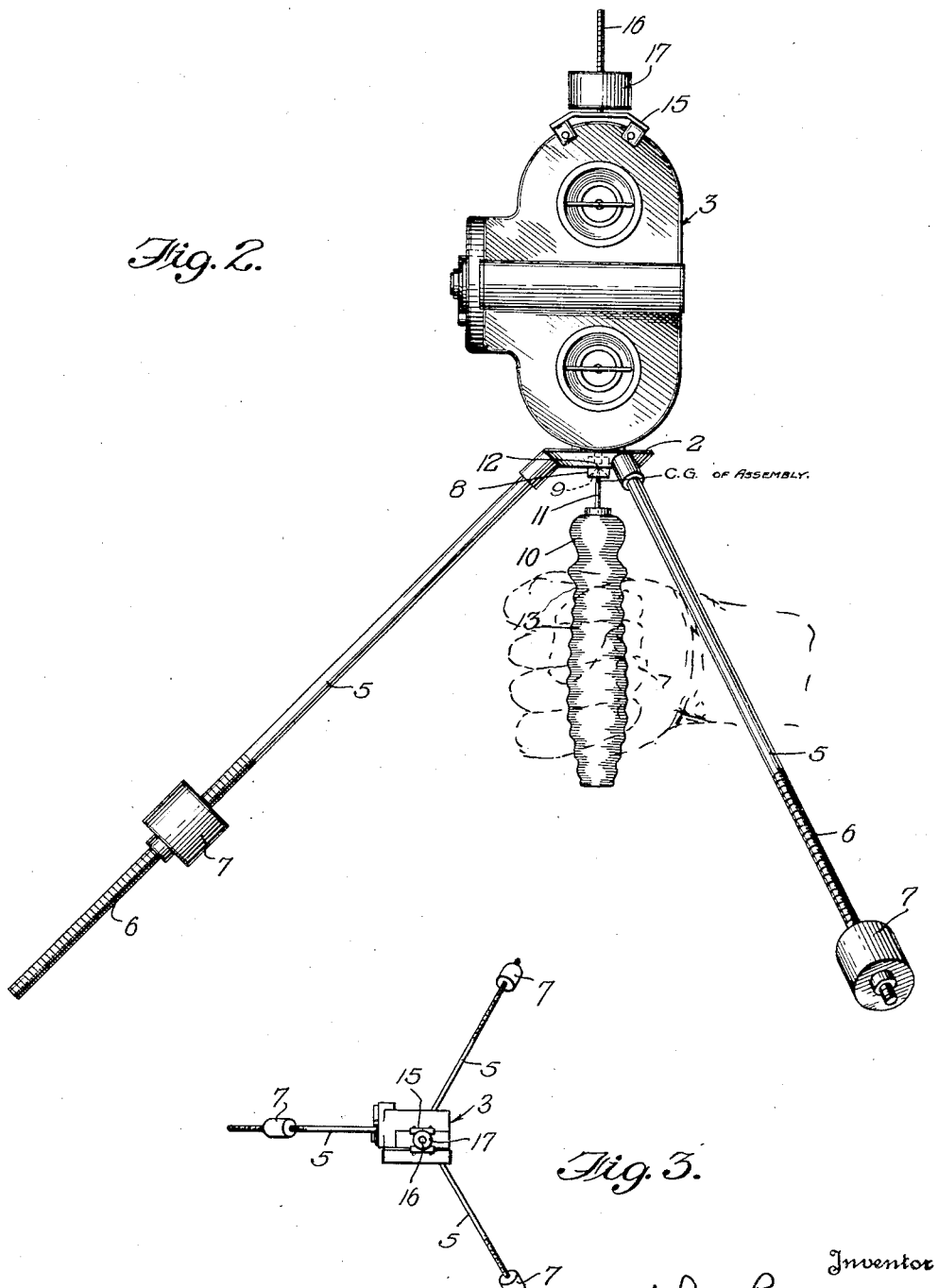

Patented July 9, 1935

2,007,215

UNITED STATES PATENT OFFICE 2,007,215

STABILIZED VIBRATION ABSORBING MOUNTING

John T. Remey, New York, N. Y.

Application November 12, 1931, Serial No. 574,668

4 Claims. (Cl. 248—1)

The invention comprises a means for mounting devices which in use are directionally trained and oftentimes must be moved or subjected to extraneous directional changing effects. In devices of this class it is important that rotational motion about horizontal or vertical axes through the point of support or angular changes of these axes be minimized during translational movement of the device. The device as a whole must be capable of movement from one place to another but this translational motion should not impart any rotation or tipping to the device. By means of this invention such desirable results are secured. For example, in an artificial horizon instrument it is important that the vertical changes of direction or rotation about horizontal axes in the course of an aeroplane be not imparted to the instrument. In a bomb sight, camera, etc., in addition to this it is desirable that rotation about a vertical axis or panoraming be prevented. Both of these requirements are fulfilled by the device of the present invention. The location of the center of gravity below the point of suspension imparts stable equilibrium.

Associated with the device to be stabilized are weights extending downwardly and outwardly with respect to the point of suspension; these weights are such, and are so placed, as to provide a high moment of inertia.

It is an important feature of the invention that the device to be stabilized have a long, slow period of oscillation. This period of oscillation depends on the ratio of the moment of inertia to the distance between the center of gravity and the point of support; such distance should be small, and the moment of inertia of the device with respect to its point of support should be large, so as to give the requisite long, slow period of oscillation. This arrangement lessens and minimizes rotation about horizontal axes or tilting and also lessens and minimizes rotation about the vertical axis of the device or panoram.

By employing the mounting of this invention translational motion, that is movement of the entire mounting and device from one place to another, is accomplished without imparting to the device rotation about any of its axes, or change in the axial directions of the device. After any translational movement of the device, the several axes would still be substantially parallel to their original position.

In motion picture work, for example, especially with small privately owned motion picture cameras which are ordinarily held in the hand, the user needs to follow the object, for it is often moving, and oftentimes needs to walk with the camera while he is taking pictures. Again, the user may be in an automobile, airplane or boat the vibrations and swingings of which would ordinarily be communicated to the camera. With the apparatus of this invention, most of these objectionable rapid oscillations and swingings which would ordinarily be communicated to the camera and which would tend to blur the picture, are eliminated.

In military work, for example, as in a machine gun, mounted on a tank or airplane, or with a bomb sight or other instrument on an airplane, the vibrations of the tank due to rough ground or the movements of the airplane due to engine vibration, bumpy air and sudden turns would tend seriously to interfere with the proper functioning of the device in question. With this invention, the camera, machine gun, bomb sight, artificial horizon or other device maintains its direction with a considerable degree of accuracy in spite of the movements of the vehicle on which it is mounted, and does not tend to rotate around horizontal or vertical axes through its center of gravity.

With these objects in view the preferred embodiment of the invention comprises an assembly consisting of the device in question such as a camera, machine gun, bomb sight, etc., and weighted stabilizing means associated with the device so that the center of gravity of this assembly is lowered to below its pivoted support and a high moment of inertia imparted to the assembly.

This assembly of the device and its associated weight or weights is supported on a fulcrum or pivot so that there is free pivotal movement between the assembly and the fulcrum or pivot. The relationship between the pivot point and the center of gravity of the assembly above mentioned is quite important, this relationship being that the center of gravity of the assembly is below the pivot point. With a motion picture camera the center of gravity of the assembly is preferably about one quarter or one-eighth of an inch for example, below the pivotal point of support. With such an arrangement, the camera or other device and its associated weights form in effect a pendulum with a very long period of oscillation, period depending on the magnitude of the distance between the pivot point of support and the center of gravity of the assembly which distance should be small, and the moment of inertia of the assembly about the point of support, which should be large. With a camera, for example, this period can be in the neighborhood of twenty or thirty seconds, although it can be varied by varying the center of gravity of the assembly.

If the pivot point were just at the center of gravity forces applied to the pivot would cause the device to move from one position to another without in any manner tending to rotate. Such a suspension would, however, put the device into neutral equilibrium and if any extraneous forces were applied it would be difficult to keep the device properly supported. For this reason I arrange the pivoted support above the center of gravity thereby establishing a stable equilibrium but also giving to the device a period of vibration which is, however, a long period if the distance between the center of gravity and the pivoted support is small. Since the extraneous forces applied to the pivot are for the most part of relatively high frequency and irregularly timed they tend to balance or neutralize one another without having any appreciable effect on the long period of swing of the device. The arrangement of the weights gives the device a high moment of inertia with respect to the vertical axis as well as the horizontal axes whereby resistance to rotation on change in condition of rest is secured.

More specifically, and in one form of the invention the weighted means for lowering the center of gravity comprises a number of downwardly and outwardly extending arms, near the lower ends of which are weights, preferably threaded onto the arms so that by turning them they will travel up and down the arms, thereby giving an adjustment which will control the position of the center of gravity of the assembly. Other types of weights or weighted means could be used in place of these arms, and so these arms are merely illustrative.

The supporting member at the top of which is the supporting pivot or fulcrum may be held by the user with one hand, while his other hand may lightly touch the assembly for guiding and steadying it. The assembly is still rotatable but due to its long slow period of oscillation its movements are so gradual that the instrument forming part of the assembly such as the camera, gun sight, bomb sight, etc., will function much more efficiently. The supporting standard above mentioned, it has been found in actual practice, can be subjected to very rapid vibration back and forth, such vibrations ordinarily having a relatively quick period, say in the neighborhood of a quarter or half a second to a second or two, but such vibrations are not transmitted to the assembly but absorb or cancel out each other without transmitting any substantial amount of rotational movement to the assembly.

In a camera, gun or bomb sight rapid angular changes in direction or panoram are the most objectionable and it is this type of movement to a large extent which is eliminated with this invention since forces applied to the pivot result in translation of the device and not rotation about the center of gravity.

In order further to control the center of gravity of the assembly and to provide a nice adjustment thereof, a vertically adjustable weight may be provided at some suitable point as by clamping it on top of the camera, the adjustment of the weight lowering or raising the center of gravity of the assembly as will be readily understood.

Since the center of gravity of a motion picture camera changes as the film travels from one magazine to another this weight may, if desired, be continuously driven by the mechanism of the camera so as to move in such a direction to keep the center of gravity of the assembly substantially constant.

The main features of the invention having been thus described, reference will now be made to the accompanying drawings illustrating the preferred way of carrying it out, as applied to a small motion picture camera. It should be understood that this disclosure is purely illustrative and that the invention may be carried out in other ways and may be applied to devices or instruments other than a camera.

In these drawings:—

Fig. 1 is a front view of the invention as applied to a camera;

Fig. 2 is a side view of the same;

Fig. 3 is a plan view on a reduced scale; and

Fig. 4 is a view of a detail of an adjustable weight.

Referring now to these drawings in which similar reference characters indicate similar parts, the apparatus comprises a base member 2 for supporting the instrument or device to be stabilized, such, for example, as a motion picture camera indicated generally at 3. The base is provided with a suitable bracket 4 or the like, for securing the camera in place.

Extending downwardly and outwardly from the base 2 and rigidly secured thereto is a plurality of arms 5, preferably metallic and provided with screw threaded portions 6, on which internally threaded weights 7 are movable.

The under side of the base 2 is provided with suitable supporting means, such as a plug 8, provided with a downwardly facing, upwardly tapering socket 9, preferably conical in shape. It should be understood that a socket of this sort could be built directly into the camera, rather than in the base 2.

A support 10 is provided in its upper part with a rod 11 which terminates in a pivotal point or fulcrum 12, which is adapted to seat in the conical socket 9. The support 10 may be provided with a handle portion 13. This handle may if desired be extended and rigidly mounted upon an airplane, tank, automobile, etc.

The base 2 with the arms 5 and weights 7 and the camera or other device 3 constitute a unitary assembly which is pivotally mounted on the point 12. The weights 7 are so adjusted that the center of gravity of this assembly is just below the supporting pivot or fulcrum 12. In practice, the distance of the center of gravity below the pivotal point is preferably less than a quarter of an inch and may be about one-eighth of an inch, the result of which is that the assembly has a slow period of sway or oscillation about the pivot point, of say about 20 to 40 seconds.

In order to give a fine adjustment of the center of gravity the top of the camera may be provided with a bracket 15 which clamps to the camera in any convenient way, this bracket supporting a threaded rod 16 and an internally threaded weight 17 which is adjustable vertically on the rod.

With a motion picture camera where the film feeds from one magazine to another, the center of gravity of the assembly will be affected due to the consequent change of weight, and in order to compensate for this the modification shown in Fig. 4 may be used, where the top of the camera is provided with a bracket 20 and a pair of vertical guide rods 21 which engage in suitable grooves in a weight 22. A flexible drive cable 23 which is driven from the mechanism of the camera drives a worm 24 which meshes with the worm wheel 25 which is rigid with a threaded shaft 26. The weight 22 is internally screw threaded for cooperation with shaft 26. As the camera is operated, the threaded shaft 26 will be rotated to raise or lower the weight as may be necessary to compensate for the feed of the film from one magazine to the other so as to keep the center of gravity of the assembly substantially constant.

In use the operator takes hold of the handle 13, say in his right hand, and lightly touches the base 2 or one of the arms 5 near the base so as to keep the camera on the objective. The assembly of the camera and weights can and does move, but this movement is translational. Quick vibrations which might result from twisting, walking, turning or from the vibrations of an automobile or airplane or tank which might be applied to the support 10 are for the most part absorbed or neutralized by the mounting described, they apparently serving to cancel out each other because their period of oscillation is very quick, ranging perhaps from a half second to a second or two, as compared with the slow twenty-second or thirty-second period of oscillation of the camera and weight assembly. In actual practice, the handle 13 can be rotated about a vertical axis, or wobbled back and forth or fore and aft, with very little of this motion being communicated to the camera.

The particular type of weighted means shown for lowering the center of gravity of the assembly could take other forms, the three arms shown on the drawings being merely illustrative.

The disclosure, therefore, is to be considered illustrative and not restrictive of the invention and it should be understood that it may be carried out in other ways.

I claim as my invention:—

1. Means for manually supporting a camera when in use which comprises a base member, means for securely attaching a camera to the said base member, a handle under the base member engaging the underside of the base member to provide a point of support for the base member, and weight means extending downwardly and outwardly from the base member to counterbalance the weight of the camera and to bring the center of gravity of the assembly below the said point of support, thereby attaining a slow period of oscillation of the assembly.

2. Means for manually supporting a motion picture camera when in use which comprises a base member, means for securely attaching a camera to the said base member, a handle under the base member, the upper end of which engages the underside of the base to provide a point of support for the base, and a plurality of arms attached to the said base member and extending downwardly and outwardly therefrom, the said arms having counter-balancing weights at the lower ends thereof so that the center of gravity of the assembly will be below the point of support or point of contact of the base member with the said handle, whereby the assembly has a slow period of oscillation.

3. Means for manually supporting a motion picture camera when in use which comprises a base member, means for securely attaching a camera to the said base member, a handle under the base member the upper end of which engages the underside of the base to provide a point of support for the base, and a plurality of arms attached to the said base member and extending downwardly and outwardly therefrom, the said arms having adjustable weights thereon to permit counter-balancing the weight of the camera, whereby the center of gravity of the assembly may be maintained below the point of support of the base member on the said handle to attain a slow period of oscillation of the assembly.

4. Means for manually supporting a motion picture camera when in use which comprises a base member, socket means on the underside of said base, a handle under the base member the upper end of which engages in said socket to provide a point of support for the base member, means for securely attaching a camera to the base member, a plurality of arms attached to the said base member extending downwardly and outwardly therefrom, and adjustable counter-balancing weights on said arms whereby the position of the weights may be adjusted so that the center of gravity of the assembly is a short distance below the point of support, whereby the assembly will have a slow period of oscillation.

JOHN T. REMEY.